Dec. 16, 1952    H. A. LEDIG    2,621,737
TAPE DISPENSING MACHINE
Filed Dec. 3, 1948    3 Sheets-Sheet 1
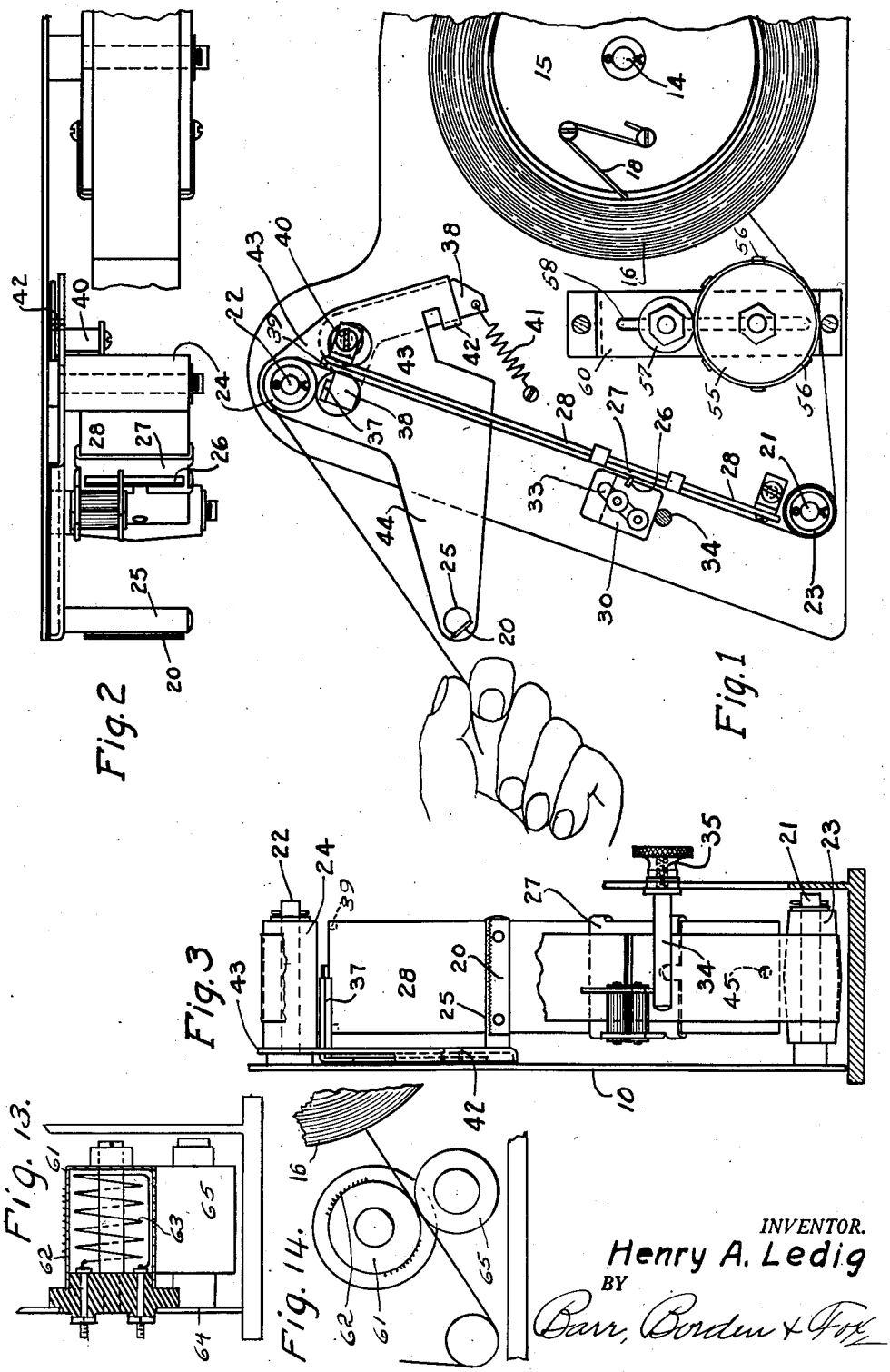
INVENTOR.
Henry A. Ledig
BY
Barr, Borden & Fox Dec. 16, 1952     H. A. LEDIG     2,621,737
TAPE DISPENSING MACHINE
Filed Dec. 3, 1948     3 Sheets-Sheet 2
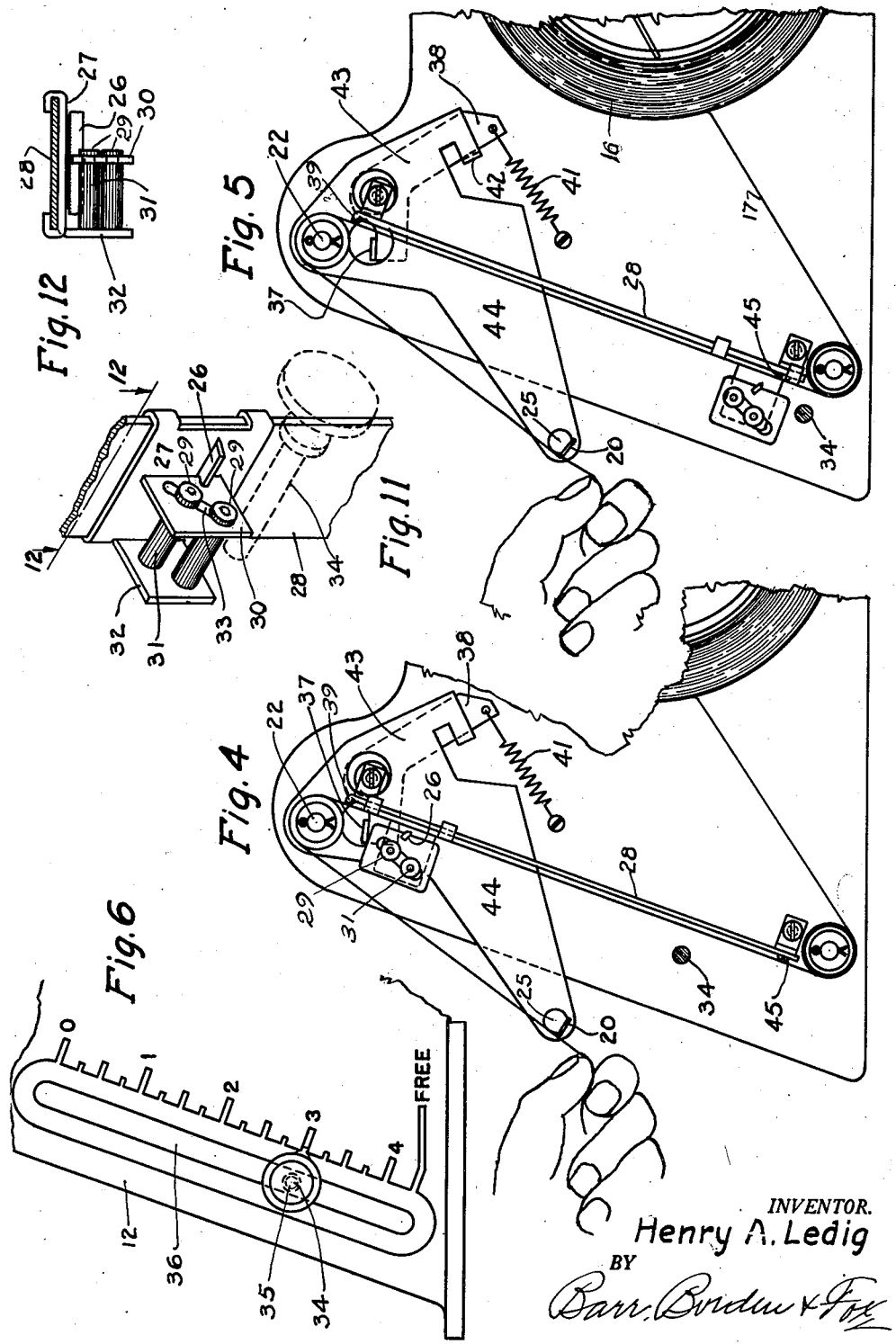
INVENTOR.
Henry A. Ledig
BY
Barr, Borden & Fox

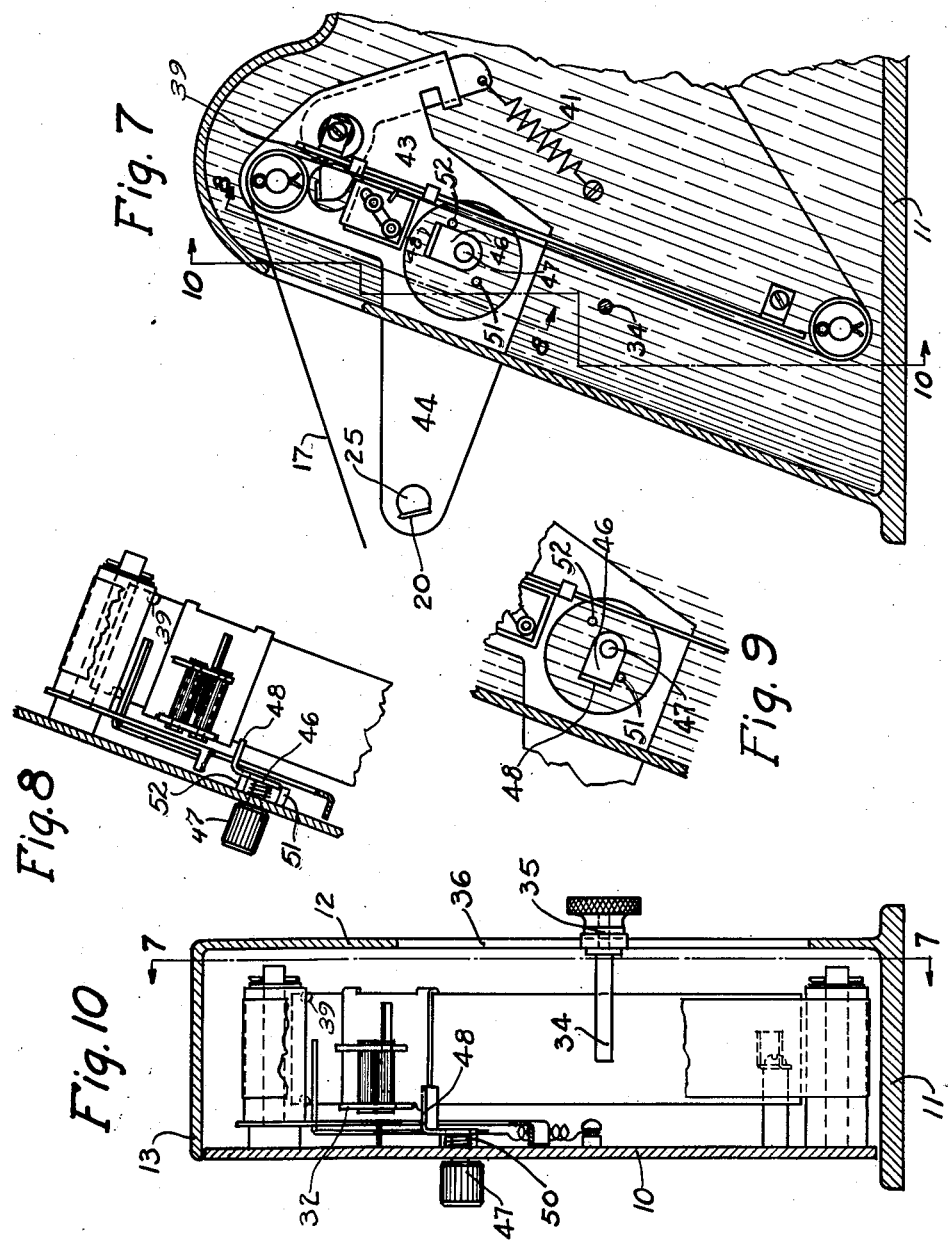

Patented Dec. 16, 1952

2,621,737

UNITED STATES PATENT OFFICE 2,621,737

TAPE DISPENSING MACHINE

Henry A. Ledig, Philadelphia, Pa., assignor to Penn Devices Co., Philadelphia, Pa., a corporation of Pennsylvania Application December 3, 1948, Serial No. 63,376

23 Claims. (Cl. 164—84.5)

The present invention relates to dispensing machines and more particularly to the dispensing of tape withdrawn from a roll in measured lengths or continuous unmeasured length, the latter generally designated as "free wheeling."

In tape dispensers of the type to which the invention relates and heretofore on the market, the tape withdrawal, where the tape is of the tacky or adhesive side type, is dependent upon the gummed or tacky side for proper functioning of the withdrawing mechanism. While such prior mechanisms are to a degree satisfactory, no provision is made for dispensing tape which is not of the adhesive variety and hence the field of use is materially restricted. Furthermore, such prior devices in so far as applicant is aware are not equipped for automatically changing from measuring withdrawal to free wheeling withdrawal, and the latter is only possible by using one hand to release the measurement control, while the other hand manipulates the pulling out of the tape. Obviously, this is a disadvantage of considerable moment where the usual rapid operation of the machine is concerned.

Some of the objects of the present invention are: to provide an improved tape dispensing machine; to provide a tape dispensing machine which functions with the same efficiency upon adhesive tape or non-adhesive tape; to provide a dispensing machine wherein the measuring control unit is automatically clamped to the tape as it is being withdrawn; to provide a tape dispensing machine wherein tape can be withdrawn either in measured length or continuous by simple manipulation with one hand of the user; to provide a dispensing machine wherein all operations are positive and independent of tacky surfaces for such operations; to provide a tape dispenser: from which any desired gradation of dispensed lengths can be obtained within the maximum limits of the dispenser; with means for quickly and easily effecting changes in the predetermination of the lengths of the dispensed portions: by which a measuring unit predetermines the lengths of withdrawn portions of tape by which selectively either multiples of the measured lengths without severance or any desired unmeasured lengths can be dispensed: by which easily and quickly the lengths of withdrawn tape can be coordinated with preformed indicia on the tape so as to center same in the withdrawn lengths: with indicia-impressing means, such as printing, embossing, marking or perforating so arranged in spacing of indicia as to accord with a known predetermined measured length of tape as to center the indicia thereon, with replacement indicia elements coordinated with other predetermined lengths of tape to center the indicia thereon: with a measuring unit having a movable control element adjustable with reference to a series of distance calibrations by which predeterminedly measured lengths of tape can be dispensed; and to provide other improvements as will become apparent as the description proceeds.

In the accompanying drawings, Fig. 1 represents a side elevation, partly broken away, of a tape dispensing machine embodying one form of the present invention, one side and front of the casing being removed for viewing the mechanism; Fig. 2 represents a plan of the assembly shown in Fig. 1; Fig. 3 represents a front elevation of the assembly of Fig. 1; Fig. 4 represents a side elevation of the assembly of Fig. 1 showing the position of the parts for a measured length of tape to be severed, the measuring control having stopped further withdrawal of tape; Fig. 5 represents a side elevation of the same assembly with the measuring control released and the tape being severed; Fig. 6 represents a detail in side elevation of the adjustable measuring control; Fig. 7 represents a section on line 7—7 of Fig. 10, showing a modification for free wheeling withdrawal of tape; Fig. 8 represents a section on line 8—8 of Fig. 7; Fig. 9 represents a fragmentary detail showing the free wheeling control in inoperative position to permit measured lengths of tape to be withdrawn; Fig. 10 represents a section on line 10—10 of Fig. 7; Fig. 11 represents a fragmentary perspective of the measuring control unit; Fig. 12 represents a section on line 12—12 of Fig. 11; Fig. 13 represents a fragmentary elevation partially in section of a roller assembly for branding indicia on tape; and Fig. 14 represents a fragmentary side elevation of the roller assembly of Fig. 13, with portions of the housing removed.

Referring to the drawings, one form of the present invention comprises a support 10, which, in the present instance, is a vertically disposed plate for supporting the several mechanisms of the complete assembly. Also the plate support 10 serves as the closure for the casing in which the parts are housed when the plate is in place. The casing is a box-like member formed with a base 11, back 12, and top 13, to the open side of which the support 10 is removably attached as a closure. At a selected location on the inner face, a spindle 14 is fixed to project horizontally as a journal for the core 15 of a roll 16 of tape 17, which latter is arranged for replacement and is held in operative relation on the core 15 by the action of a spring 18.

For guiding the tape 17 to the cutting blade 20, the support mounts two inwardly disposed fixed arbors 21 and 22 for respectively journalling two rollers 23 and 24, both of which have cotter pin retainers for removal and replacement. As shown, the roller 23 is below the axis of the tape roll while the roller 24 is above that axis, and preferably in a vertical plane passing between the vertical planes respectively of the pin 14 and the arbor 21. Thus, as shown in Fig. 1, the tape 17 passes downwardly and under the roller 23 to ride upwardly in an inclined path and over the roller 24, where it can be grasped for withdrawal. Preferably, the periphery of the roller 24 is knurled for friction contact. From the roller 24 the tape is brought over the blade 20 for severing by down pressure, while a fixed post 25 forms a means for supporting the tape ready to be gripped for withdrawing the next length. This pin 25 also serves as a support for the cutting blade 20, which latter is located on the outer side of the pin with respect to the roller 24.

In order to measure predetermined lengths of tape as withdrawn, a reciprocable tape control device is provided which automatically grips the tape prior to its withdrawal, and retains its grip and travels with the tape a distance predetermined by whatever cut length the machine is set for as will be described. As shown, this control comprises a gripping or clamping jaw 26 in the form of a transverse strip, mounted parallel to the face of the tape and in such close proximity thereto as to require small movement to engage same Preferably the biting edge of the jaw 26 is serrated. The gripping action is made possible by providing a cooperating jaw in the form of an anvil plate 27, slidably mounted upon a fixed guide member 28 in edge parallel relation to the inner face of the support 10 to which it is attached. Guide member 28 lies between the tape roll and the tape as the latter travels from the lower guide roller 23 to the upper guide roller 24, and being substantially parallel to this portion of the tape. The gripping jaw 26 is carried by a thin wedging or camming element 30, the two assembled parts having in plan a T shape of which the jaw 26 forms a substantially horizontal head. The element 30 is slidably mounted for motion on an inclined path acutely intersecting the anvil plate 27, by means of rollers 29 rotatable on the reduced portions of two angularly superposed pins 31 projecting laterally from an offset flange 32, formed as part of the anvil plate 27. The aforesaid rollers on pins 31 pass through a slot 33 in the element 30, with flanges or washers on the pins on both sides of the plate for retaining the element in free sliding relation. The slot 33 is upwardly and rearwardly inclined toward the anvil plate and has minimal friction relative to the rollers on the pins to facilitate relative gripping and ungripping motions of the jaw relative to the anvil plate 27; to positions shown in Figs. 1 and 4, respectively. This angular slot and pin construction is such that a vertically applied lift force will cause the jaw 26 to move towards the anvil plate 27 the required distance to clamp the tape between the two parts. The slot 33 is longer than the distance between the two centers of the pins 31 so that sufficient clearance is provided for the required movement. Also, it should be noted that the wedge element 30 is longer than the width of the flange 32 so that in wedging position the upper end of the element 30 is well above the top of the flange 32 while in non-wedging position its lower end is enough below the plane of the bottom of the flange 32 to permit the lift force to shift the element 30, to its tape gripping or clamping position. This lift action is brought about by locating a fixed pin 34, adjustable as to position, upon the back 12 of the casing below and in the downward path of movement of the element 30, as the latter drops by gravity. Hence, when the element 30 strikes the pin 34 it will be given the required angular lift to clamp the tape against the anvil plate 27. The position of the pin 34 determines the measured length of tape to be drawn off and therefore is carried by a clamping rider 35 adjustable in a slot 36 in the casing back 12, such slot lying in the plane of travel of the jaw 26. A scale graduated in inches or other measuring indicia preferably parallels the slot 36 and is useful for accurate selected measurement. In this way the withdrawal of the tape is measured and determined by the length of drop of the gripping control unit.

In order to stop the upward travel of the control clamping unit when the measured length of tape has been withdrawn, fixed abutment 39 is disposed on guide 28 in the path of anvil plate 27, as an upward limit, with upper edge of plate 39 juxtaposed to a trigger stop 37, disposed in the path of the jaw 26 at the upper limit of its movement and mounted on a trigger lever 38 pivotally mounted at 40 on the support 10 and biased to stop position by a tension spring 41 stretched between the proper end of the lever 38 and a fixed point on the support 10. This tensioned end of the trigger lever 38 over-rides a lug 42 on the adjacent end of an operating lever 43 which is pivoted upon the arbor 22 and terminates in an extension arm 44 projecting outside of the casing and upon which the cutting blade 20 and support post 25 are mounted to extend horizontally just below the path of the tape being withdrawn. By reason of the eccentric mounting of the trigger lever 38 and the operating lever 43, a downward movement of the latter causes the trigger stop 37 to swing on such an arc as will kick the wedge member downward and thereby release the clamping jaws.

The steps in the tape withdrawal and control are as follows: By reference to Fig. 1 the tape is in position for withdrawing the tape and the measuring control unit having contacted the set pin 34, the wedge element 30 has been moved upwardly to shift the jaw 26 to tape-engaging position, whereby the latter is gripped between the jaw 26 and the slidable anvil plate 27. Now as the tape is withdrawn the clamping unit follows along until it strikes the limit stop 37, and as this indicates the set measured length has been withdrawn and prevents further withdrawal, the pulling hand is lowered as shown in Fig. 4 to sever the tape by pressure across the face of the cutting blade 20, which pressure swings the arm 44 of the operating lever 43 counter-clockwise to thereby likewise turn the trigger lever 38, so that the trigger stop 37 kicks the wedge element 30 downward and pulls the jaw 26 away from clamping position. When this takes place the measuring unit drops by gravity until it strikes the set pin 34 whereupon the wedge element is restored to tape-clamping position ready to move with the tape when again withdrawn.

For the purpose of free wheeling, that is withdrawing long lengths without measurement, the measure setting pin 34 is moved to its lowermost limit and below a stop in the form of a screw head 45, which projects from the face of the strip 28 into the path of the anvil plate 27 to thereby stop the downward movement of the plate 27 while not interfering with the wedge element 30. Since the element 30 cannot contact the pin 34 it remains with the jaw 26 out of clamping position and spaced from the face of the tape during a withdrawing movement. With the parts in this relation, as long a length of tape as desired can be pulled off and the measuring control remains ineffective.

A modified free wheeling construction is shown in Figs. 7, 8, and 9, wherein an oscillatable member 46 is fixed to a knurl-headed pin 47 on a horizontal axis for the quarter turn positioning of a laterally disposed stop 48 into and out of the path of the anvil flange 32, but spaced from the path of the wedge element 30. The pin 47 is journalled on the support 10 with its head on the outside, while on the inner side a tension spring 50 biases the member 46 so that it is anchored in either of its operating positions. A pair of limit stops 51 and 52 project inwardly from the support 10 to respectively position the stop 48 in free wheeling position, or the position for measurement control.

It will be apparent however that if during the withdrawal of predetermined short lengths a mere temporary change to longer lengths is desired, without the necessity for setting the mechanism for free wheeling, the apparatus described is perfectly adapted for this functioning, with the longer lengths multiples of the predetermined short lengths. For this purpose following the procedure already outlined, and assuming a preset measured length of two inches as a purely typical instance, a two inch measured strip will be withdrawn but not severed. Using the tape for the pressure it will be held extended and pressed against the element 25 hard enough to cause tripping of the resetting stop to release the measuring device from the tape followed by an immediate re-grip of the tape for a next succeeding two inch strip for withdrawal, but without the severance of the withdrawn tape length. This is because the relation of the parts as shown in Fig. 4, for instance preferably times the release of the measuring gripping device by motion of resetting stop 37 a little ahead of the severance, and the latter requires at least a slight bend of the withdrawn tape over the knife blade, as shown in Fig. 5. By this procedure, or if desired, by withdrawing tape as a straight length and manually tripping the lever 44 with the other hand of the operator, a long length comprised of multiples of the measured length can be withdrawn without disturbing the setting for the individual measured lengths.

When it is desired to make the simple mechanical manipulation necessary to cause free wheeling without having the withdrawn tape stopped momentarily in withdrawal as the measured lengths are withdrawn, and without disturbing the setting of the measured lengths, the device shown in Fig. 7 is particularly desirable. Without disturbing the setting of the stop 34 a length of tape is withdrawn, moving the measuring gripping unit away from the stop 34. The element 46 is turned into the path of the gripping unit, and the lever 44 is tripped to actuate resetting stop 37 to release the grip on the tape. The measuring unit then drops the short distance necessary to engage the arm 48, out of contact with the sliding element 30. The unmeasured lengths can then be withdrawn freely and severed without disturbing any setting of the machine. When it is desired to return to measured lengths of tape, the knob 47 is turned, the arm 48 is withdrawn arcuately from under the measuring unit, which then drops the remaining distance to the stop 34, and the measuring of the lengths withdrawn is instantly resumed.

Although it will usually be the case that the stop 34 will be positioned in accordance with the graduations of the scale to predetermine the lengths of withdrawn tape in terms, for instance of inches and fractions of inches, it will be clear that the setting of the stop 34 may be any of an infinite number of settings available so that extremely minute incremental changes in lengths can be secured. While this is of importance in the dispensing of tape of all sorts by the mechanism disclosed, it is particularly valuable in the dispensing of printed or marked tape, whether of the pre-printed or pre-marked type, or printed or marked by the mechanism to be described hereinafter. In many cases of marked tape certain spacings are observed between adjacent indicia. It is desirable that each withdrawn length contain the indicia substantially centered thereon between the severed ends. With arbitrary and inflexible measuring tape dispensers such symmetrical centering of the indicia is a haphazard matter of chance, and if out of register they tend to remain so, or there is relative creep to cause eventual failure of registration. It will be seen that regardless of spacings of the trade marks, numbers, or like indicia on the tape the range of adjustments of predetermined lengths established by the invention herein can always find a tape length which accords with the indicia spacing to attain symmetry of the indicia on the severed lengths. Note that in the illustrative embodiment of the machine the maximum measured withdrawn length, representing the maximum capacity of the machine, is four inches. Any gradation of length down to an impractically short one is possible with the mechanism shown.

It is a feature of the invention that means be provided operated as a function of the withdrawal of the tape for marking, impressing, embossing or otherwise changing the surface characteristics of the tape as to create a visual indicia impression. These devices are preferably provided as rollers in the nature of idler rollers in contact with at least one surface of the tape to be rotated thereby, or otherwise driven in synchronism therewith. The marking rollers are preferably provided in such circumference and with the indicia thereon angular spaced peripherally of the rollers as to accord with predetermined known lengths of tape to center the indicia in the cut lengths thereof. Thus if the withdrawn severed tape length is to be one inch, there would be a roller coordinated therewith as to place one indicia indication on the tape in such relation to the severed ends as to be centered thereon. If the desired severed lengths are two inches, a separate and different but coordinated roller will be provided, and so on. While any form of indicia impressions can be applied within the scope of this invention, one of the simplest and the presently preferred form comprises an idler printing roll 55 having type or like indicia transmitting elements 56 in relative angular spacing peripherally of the roller, mounted for adjustment in the slot 58 in a bracket 60, detachably mounted on the frame of the machine. An inking roller 57 is mounted on the bracket and the assembly is suitably disposed to frictionally engage and mark tape. Illustratively, but preferably, roller 55 is mounted between the tape roll 16 and lower idler roller 23. If the tape happens to be of the pressure sensitive type coated on one side only, the printing and the friction drive is relative to the dry side of the tape, although this is not of particular importance.

As a modification of the indicia impressing means I provide a hollow cylinder 61 of heat conducting metal having raised points 62 in the form of the desired indicia in mutually spaced relation about the hollow cylinder. The cylinder is mounted for rotation about a stationary heating element 63, such as a resistance element, mounted fixedly to a mounting bracket 64, with leads extending for connection to a source of current. A cushioned roller 65 is adjustably mounted on the bracket 64 in contact with the cylinder 61, and the tape is fed from the roll 16 between the cushion roller and the branding cylinder roller. The heated points brand or discolor the tape as it passes between the branding and cushion rollers, with a visual indication on the tape.

It will now be apparent that a complete unitary machine has been provided by which tape of any sort or material can be dispensed, including fabric tapes, paper tapes, with or without an adhesive coating, and cellulose acetate and like tapes, either with or without the pressure sensitive coatings. Measured lengths of tapes of any description are positively controlled without reliance upon the frictional characteristics of the tape dispensed for the control functions. It will be apparent that both measured and unmeasured lengths of tape can be selectively dispensed with a minimum of disturbance or manipulations, and without disturbing preset parts of the mechanism.

Having thus described my invention, I claim:

1. In tape dispensers, a frame, a measuring device mounted on the frame and guided between limits in a cyclic motion from one limit to the other and return to the first limit, means on the frame for guiding tape from a roll to a delivery point, movable means at the delivery point for severing a withdrawn measured length of tape, said measuring device incorporating releasable means for engaging tape, means at one of said limits for automatically actuating the releasable means to engage the measuring device with the tape in response to and as a function of motion of the measuring device independent of the tape, and means at the other of said limits for automatically actuating the releasable means to disengage the measuring device and tape at the conclusion of joint movement of the tape and said measuring device operable synchronously with and in response to movement of the said movable means and releasing the tape at the other of said limits whereby a cyclic guided motion of the measuring device is initiated solely by withdrawing a tape length under tension on the tape adjacent to said delivery point measured by the length of guided motion of the measuring device through one half of the total cycle thereof.

2. In tape dispensers, a frame, a measuring device mounted on the frame and guided between limits in a cyclic motion from one limit to the other and return to the first limit, means on the frame for guiding tape from a roll to a delivery point, movable means at the delivery point for severing a withdrawn measured length of tape, said measuring device incorporating releasable means for engaging tape, means at one of said limits for automatically actuating the releasable means to engage the measuring device with the tape in response to and as a function of motion of the measuring device independent of the tape, and means at the other of said limits for automatically actuating the releasable means to disengage the measuring device and tape at the conclusion of joint movement of the tape and said measuring device operable synchronously with and in response to movement of the said movable means and releasing the tape at the other of said limits whereby a cyclic guided motion of the measuring device is initiated solely by withdrawing a tape length under tension on the tape adjacent to said delivery point measured by the length of guided motion of the measuring device through one half of the total cycle thereof, and means for adjusting one of said limits to vary the length of said half cycle.

3. In tape dispensers, a support, a measuring guide on the support, means on said support for guiding tape from a roll to a delivery point with a portion of the tape extending and moving adjacent to and in general parallelism with said measuring guide as tape is withdrawn at such delivery point by tension on the tape, measuring means slidable relative to said measuring guide, means in operative association with the measuring means for causing automatic attachment of the measuring means and tape toward one end of a guided movement of the measuring means whereby withdrawal of tape and consequent movement of such tape portion adjacent to said measuring guide moves the measuring means on its guided path with the tape in withdrawal as its only motivating force, stop means toward the opposite end of the guided path of movement of the measuring means to limit withdrawing of the tape to determine a measured length thereof, means for severing withdrawn tape, and means operated automatically synchronously with the severing of the tape for disengaging the measuring means and tape to permit return of the measuring device on its guided path relative to a new portion of the tape adjacent to said guide to operative association with the means for causing attachment of the measuring means and said tape whereby withdrawal of a severed tape length is a single one-handed effectively continuous operation.

4. In tape dispensers, a support, a measuring guide on the support, means on said support for guiding tape from a roll to a delivery point with a portion of the tape extending and moving adjacent to and in general parallelism with said measuring guide as tape is withdrawn at such delivery point, measuring means slidable relative to said measuring guide, means in operative association with the measuring means for causing attachment of the measuring means and tape toward one end of a guided movement of the measuring means whereby withdrawal of tape and consequent movement of such tape portion adjacent to said measuring guide moves the measuring means on its guided path with the tape in withdrawal, stop means toward the opposite end of the guided path of movement of the measuring means to limit withdrawing of the tape to determine a measured length thereof, means for severing withdrawn tape, means operated synchronously with the severing of the tape for disengaging the measuring means and tape to permit return of the measuring device on its guided path relative to a new portion of the tape adjacent to said guide to operative association with the means for causing attachment of the measuring means and said tape, and means for changing the space relationship of the stop means and the means for causing attachment to vary the length of the measured portion of the tape.

5. In tape dispensers, a support, a measuring guide on the support, means on said support for guiding tape from a roll to a delivery point with a portion of the tape extending and moving adjacent to and in general parallelism with said measuring guide as tape is withdrawn at such delivery point, measuring means slidable relative to said measuring guide, means in operative association with the measuring means for causing attachment of the measuring means and tape toward one end of a guided movement of the measuring means whereby withdrawal of tape and consequent movement of such tape portion adjacent to said measuring guide moves the measuring means on its guided path with the tape in withdrawal, stop means toward the opposite end of the guided path of movement of the measuring means to limit withdrawing of the tape to determine a measured length thereof, means for severing withdrawn tape, means operated synchronously with the severing of the tape for disengaging the measuring means and tape to permit return of the measuring device on its guided path relative to a new portion of the tape adjacent to said guide to operative association with the means for causing attachment of the measuring means and said tape, and means for rendering the operatively associated means ineffectual to cause attachment of the measuring means and tape to permit the withdrawal of an unmeasured length of tape.

6. In tape dispensers, a support, a measuring guide on the support, means on said support for guiding tape from a roll to a delivery point with a portion of the tape extending and moving adjacent to and in general parallelism with said measuring guide as tape is withdrawn at such delivery point, measuring means slidable relative to said measuring guide, means in operative association with the measuring means for causing attachment of the measuring means and tape toward one end of a guided movement of the measuring means whereby withdrawal of tape and consequent movement of such tape portion adjacent to said measuring guide moves the measuring means on its guided path with the tape in withdrawal, stop means toward the opposite end of the guided path of movement of the measuring means to limit withdrawing of the tape to determine a measured length thereof, means for severing withdrawn tape, means operated synchronously with the severing of the tape for disengaging the measuring means and tape to permit return of the measuring device on its guided path relative to a new portion of the tape adjacent to said guide to operative association with the means for causing attachment of the measuring means and said tape, and means operative between the stop means and said operatively associated means for precluding the return of the measuring device to the latter and precluding attachment of the measuring device and tape so as to permit the withdrawal of an unmeasured length of tape.

7. In tape dispensers, a support, a measuring guide on the support, means on said support for guiding tape from a roll to a delivery point with a portion of the tape extending and moving adjacent to and in general parallelism with said measuring guide as tape is withdrawn at such delivery point, measuring means slidable relative to said measuring guide, means in operative association with the measuring means for causing attachment of the measuring means and tape toward one end of a guided movement of the measuring means whereby withdrawal of tape and consequent movement of such tape portion adjacent to said measuring guide moves the measuring means on its guided path with the tape in withdrawal, stop means toward the opposite end of the guided path of movement of the measuring means to limit withdrawing of the tape to determine a measured length thereof, means for severing withdrawn tape, and means operated synchronously with the severing of the tape for disengaging the measuring means and tape to permit return of the measuring device on its guided path relative to a new portion of the tape adjacent to said guide to operative association with the means for causing attachment of the measuring means and said tape, said measuring device comprising gripping members engaging opposite faces of the tape.

8. In tape dispensers, a stationary guide, a measuring device slidable relative to the guide and comprising an anvil portion and a gripping jaw portion mounted on and movable relative to the anvil portion between a first tape gripping position and a second tape releasing position, abutment means mounted for adjustment relative to the stationary guide and having a portion engageable with the measuring device to force the gripping jaw automatically into gripping engagement with the anvil portion, stop means in relatively fixed relation to the stationary guide to positively limit the motion of the measuring device away from the adjustably positioned abutment means without disturbing the gripping relation of the gripping jaw portion with the anvil portion, means for guiding tape from a roll through the measuring device between the respective gripping and anvil portions thereof and to a delivery point whereby a length of withdrawn tape under tension adjacent to the delivery point is measured by the distance traversed by the measuring device in moving between the abutment and said stop, and movable means operative to release the grip on the tape by moving the gripping jaw into the said second position thereof to enable the measuring device to return from the engagement with the stop to the guided reengagement with the abutment to reengage the tape.

9. In tape dispensers, a support, means on the support for guiding tape from a roll to a delivery point, measuring means, means establishing a guided path of bodily movement of said measuring means, means mounted for adjustment to establish a predetermined length of such path of bodily motion to predetermine the selected length of withdrawn tape, engaging means operative automatically at one end of the guided path for engaging the measuring means with the tape for establishing a movement of said measuring means for traversing said path solely in response to tape withdrawal, and disengaging means operative at the other end of said traversed path for disengaging said measuring means and tape.

10. A tape dispenser as recited in claim 9, and means operative to preclude the automatic operation of said engaging means to permit withdrawal of said tape in unmeasured lengths.

11. In tape dispensers, a support, means on the support for guiding tape from a roll to a delivery point, measuring means, means establishing a guided path of bodily motion of said measuring means with and solely in response to tape withdrawal for predetermining the length of withdrawn tape, means operative automatically at one end of the guided path for engaging the measuring means with the tape, means mounted for adjustable positioning to predeterminedly vary the length of such path of bodily motion to vary the length of withdrawn tape, manually operated means for severing withdrawn lengths of tape, and means operated by the manually operated means for releasing the measuring means from the tape.

12. In tape dispensers, a support, means on the support for guiding tape from a roll to a delivery point including a portion inclined from the horizontal, a stationary guide juxtaposed and generally parallel to said portion, a gripping device slidably mounted on the guide and having a gravitational component, said gripping device comprising relatively movable anvil and gripping jaw elements in relatively movable relation to define a passage for said portion of the tape, stop means toward the upper end of said stationary guide, a gripping jaw actuating abutment mounted on said support in the path of said gripping device spaced from said stop so as to predetermine the travel of said gripping device between the abutment and said stop to predetermine the length of tape that can be withdrawn, means on said gripping device for effecting relative movement of the anvil and jaw toward closing in response to the gravitational impingement of the gripping device against said abutment to establish a grip on said portion of the tape retained as the tape is withdrawn by tension applied adjacent to said delivery point and the gripping device moves with the moving tape into impingement of the gripping device against said stop to stop the withdrawal of tape, yielding severing means in relative adjacency to said delivery point, and movable means adjacent to said stop operated functionally with the yielding of said severing means in synchronism with the severance of a length of tape to actuate said means on the gripping device for effecting relative movement of the anvil and jaw toward opening to release the engagement of the gripping device on said tape adjacent to said stop to permit the gravitational return of the gripping device into impinging engagement with said abutment to reactuate said means on the gripping device to actuate the anvil and jaw toward closing to reengage the gripping device and tape.

13. In tape dispensers, a support, means for mounting a roll of tape on said support, severing means on said support, and tape guide means for guiding tape from such roll toward said severing means and including a path of a portion of the tape which is angularly inclined from the horizontal, a stationary guide mounted on the support generally parallel and juxtaposed to said path, measuring means slidably guided on said guide and having a gravitational component urging it to the lower end of the stationary guide, an abutment mounted adjustably on the support adjacent to said stationary guide and arranged for predetermined variable location relative to the longitudinal extent of said stationary guide, said measuring means including relatively movable gripping means actuated in response to impingement against said abutment for gripping tape disposed in said path adjacent to said stationary guide to cause the movement of the tape in said path in response to withdrawal of tape toward said severing means, stop means adjacent to the upper end of said stationary guide arranged upon abutment to limit the withdrawal of tape without disturbing the gripping engagement of the measuring device and said tape, said severing means being arranged for pivotal movement relative to the support in severing tape, and means actuated in response to such pivotal movement for releasing the grip of the measuring means to permit gravitational return thereof to impingement against the abutment to re-grip the tape.

14. In tape dispensers, a support, means for mounting a roll of tape on said support, severing means on said support, and tape guide means for guiding tape from such roll toward said severing means and including a path of a portion of the tape which is angularly inclined from the horizontal, a stationary guide mounted on the support generally parallel and juxtaposed to said path, measuring means slidably guided on said guide and having a gravitational component urging it to the lower end of the stationary guide, an abutment mounted adjustably on the support adjacent to said stationary guide and arranged for predetermined variable location relative to the longitudinal extent of said stationary guide, said measuring means including relatively movable gripping means actuated in response to impingement against said abutment for gripping tape disposed in said path adjacent to said stationary guide to cause the movement of the tape in said path in response to withdrawal of tape toward said severing means, stop means adjacent to the upper end of said stationary guide arranged upon abutment to limit the withdrawal of tape without disturbing the gripping engagement of the measuring device and said tape, said severing means being arranged for pivotal movement relative to the support in severing tape, and means actuated in response to such pivotal movement for releasing the grip of the measuring means to permit gravitational return thereof to impingement against the abutment to re-grip the tape, said severing means having a clearance from the guiding means to enable access by the fingers of an operator for purposes of withdrawal of a measured length.

15. In tape dispensers, a support, means for mounting a roll of tape on said support, severing means on said support, and tape guide means for guiding tape from such roll toward said severing means and including a path of a portion of the tape which is angularly inclined from the horizontal, a stationary guide mounted on the support generally parallel and juxtaposed to said path, measuring means slidably guided on said guide and having a gravitational component urging it to the lower end of the stationary guide, an abutment mounted adjustably on the support adjacent to said stationary guide and arranged for predetermined variable location relative to the longitudinal extent of said stationary guide, said measuring means including relatively movable gripping means actuated in response to impingement against said abutment for gripping tape disposed in said path adjacent to said stationary guide to cause the movement of the tape in said path in response to withdrawal of tape toward said severing means, stop means adjacent to the upper end of said stationary guide arranged upon abutment to limit the withdrawal of tape without disturbing the gripping engagement of the measuring device and said tape, said severing means being arranged for pivotal movement relative to the support in severing tape, means actuated in response to such pivotal movement for releasing the grip of the measuring means to permit gravitational return thereof to impingement against the abutment to re-grip the tape, and means for precluding gripping engagement of the measuring device and said tape when unpredetermined lengths are to be withdrawn.

16. In tape dispensers, a support, means for mounting a roll of tape on said support, severing means on said support, and tape guide means for guiding tape from such roll toward said severing means and including a path of a portion of the tape which is angularly inclined from the horizontal, a stationary guide mounted on the support generally parallel and juxtaposed to said path, measuring means slidably guided on said guide and having a gravitational component urging it to the lower end of the stationary guide, an abutment mounted adjustably on the support adjacent to said stationary guide and arranged for predetermined variable location relative to the longitudinal extent of said stationary guide, said measuring means including relatively movable gripping means actuated in response to impingement against said abutment for gripping tape disposed in said path adjacent to said stationary guide to cause the movement of the tape in said path in response to withdrawal of tape toward said severing means, stop means adjacent to the upper end of said stationary guide arranged upon abutment to limit the withdrawal of tape without disturbing the gripping engagement of the measuring device and said tape, said severing means being arranged for pivotal movement relative to the support in severing tape, means actuated in response to such pivotal movement for releasing the grip of the measuring means to permit gravitational return thereof to impingement against the abutment to re-grip the tape, and means for precluding gripping engagement of the measuring device and said tape when unpredetermined lengths are to be withdrawn, said means constituting an auxiliary stop and means for moving the auxiliary stop into and out of the path of the measuring means on said stationary guide.

17. In tape dispensers, a support, means for mounting a roll of tape on said support, severing means on said support, and tape guide means for guiding tape from such roll toward said severing means and including a path of a portion of the tape which is angularly inclined from the horizontal, a stationary guide mounted on the support generally parallel and juxtaposed to said path, measuring means slidably guided on said guide and having a gravitational component urging it to the lower end of the stationary guide, an abutment mounted adjustably on the support adjacent to said stationary guide and arranged for predetermined variable location relative to the longitudinal extent of said stationary guide, said measuring means including relatively movable gripping means actuated in response to impingement against said abutment for gripping tape disposed in said path adjacent to said stationary guide to cause the movement of the tape in said path in response to withdrawal of tape toward said severing means, stop means adjacent to the upper end of said stationary guide arranged upon abutment to limit the withdrawal of tape without disturbing the gripping engagement of the measuring device and said tape, said severing means being arranged for pivotal movement relative to the support in severing tape, means actuated in response to such pivotal movement for releasing the grip of the measuring means to permit gravitational return thereof to impingement against the abutment to re-grip the tape, and means for precluding gripping engagement of the measuring device and said tape when unpredetermined lengths are to be withdrawn, said means constituting an auxiliary stop and means for moving the auxiliary stop into and out of the path of the measuring means on said stationary guide, said auxiliary stop means being disposed for engagement by the measuring device at a different point from that which engages the abutment, so as to maintain non-gripping relation of the measuring device and tape.

18. A tape dispenser comprising a support, means for journalling a roll of tape on said support, means for guiding such tape to a discharge point for severing as such tape is withdrawn by hand by tension on such tape, a measuring control unit, generally vertical guide means mounting the unit for reciprocatory sliding movement in a generally vertical path so as to control one part of said movement by gravity, means carried by such unit for releasably gripping the tape to cause the other part of said movement as such tape is withdrawn, and movable means operating during a severing of the tape for automatically releasing said gripping means to restore said unit for another measuring operation.

19. A tape dispenser comprising a support, means on said support for journalling a roll of tape, means guiding such tape from such roll to a discharge point for severing as such tape is withdrawn under tension by hand, a measuring control unit, means mounting the unit for reciprocatory sliding movement in a substantially vertical path so as to control one part of said movement by gravity, means carried by said unit for gripping such tape to cause the other part of said movement as such tape is withdrawn, movable means operating during a severing of such tape for automatically releasing said gripping means to restore said unit for another measuring operation, and means for varying the length of the reciprocatory movement, whereby selected withdrawn lengths can be chosen at will.

20. In tape dispensers, a support, means on the support for guiding tape from a roll to a delivery point, measuring means, means establishing a guided path of bodily motion of said measuring means with tape withdrawal for predetermining the length of withdrawn tape comprising a slidable guided anvil plate having an off-set lug, means mounting a pair of rollers for rotation relative to said lug with their axes parallel to the anvil plate, a wedging plate having a slot engaged by said rollers and inclined toward the anvil plate, and a tape gripping jaw mounted on the wedging plate transverse of the guided motion of the anvil plate whereby relative upward pressure on the wedge plate causes the jaw to engage the anvil plate, while relative downward pressure thereon causes the jaw to release the anvil plate.

21. A tape dispenser comprising a support, means on said support for journalling a roll of tape, means guiding such tape from such roll to a discharge point, a measuring control unit mounted for two-stroke reciprocatory sliding motion in a fixed path, means establishing said fixed path means carried by said unit for gripping such tape as to cause one stroke of such motion upon withdrawal of the tape, a pivoted element on the support adjacent to the discharge point, and means in operative relation to said gripping means at the end of said one stroke actuated by and responsive to movement of the pivoted element relative to the support for releasing said gripping means to initiate the other stroke of said motion to restore said unit for another measuring operation.

22. A tape dispenser as recited in claim 21 in which a severing blade is mounted on the pivoted element relative to which withdrawn tape may be severed after moving said pivoted element relative to said support.

23. A tape dispenser comprising a support, means on said support for journalling a roll of tape, means guiding such tape from such roll to a discharge point for severing as such tape is manually withdrawn under tension, a measuring control unit, means mounting said unit for reciprocatory sliding movement in a generally vertical path so as to control one part of said movement by gravity, means carried by said unit for gripping such tape to cause the other part of said movement with withdrawal of tape, a pivoted element mounted on the support, means on the support establishing limits to the path of oscillation of said pivoted element, a severing knife mounted on said pivoted element adjacent to said delivery discharge point, and means operated by and in response to movement of the pivoted element from one limit toward the other limit ment from one limit toward the other limit for releasing said gripping means at the other part of said reciprocatory movement of said unit to gravitationally restore said unit for another measuring operation, said severing knife being operative against the relatively tensioned withdrawn tape only at one of said limits whereby motion of the pivoted element sufficient to actuate the means operated in response to pivoted element movement functions to release said gripping means without necessarily requiring severing of the withdrawn tape.

HENRY A. LEDIG.

REFERENCES CITED

The following references are of record in the file of this patent:

UNITED STATES PATENTS

| Number | Name | Date |
|---|---|---|
| Re. 16,774 | Uttz | Oct. 18, 1927 |
| 536,077 | Groeber | Mar. 19, 1895 |
| 937,064 | Geary | Oct. 19, 1909 |
| 1,133,922 | Brila et al. | Mar. 30, 1915 |
| 1,293,963 | Snowden | Feb. 11, 1919 |
| 1,638,816 | Krueger | Aug. 9, 1927 |
| 1,962,721 | Krueger | June 12, 1934 |
| 2,024,556 | Watters | Dec. 17, 1935 |
| 2,178,722 | Demattia | Nov. 7, 1939 |
| 2,481,704 | Werth | Sept. 13, 1949 |